United States Patent
Medinei et al.

(10) Patent No.: US 12,327,477 B2
(45) Date of Patent: Jun. 10, 2025

(54) VEHICLE SYSTEMS AND COLLISION DETECTION METHODS WITH OCCLUSION MITIGATION

(71) Applicant: GM GLOBAL TECHNOLOGY OPERATIONS LLC, Detroit, MI (US)

(72) Inventors: Nojan Medinei, Toronto (CA); Mansoor Alghooneh, Richmond Hill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 296 days.

(21) Appl. No.: 18/186,422

(22) Filed: Mar. 20, 2023

(65) Prior Publication Data
US 2024/0321105 A1 Sep. 26, 2024

(51) Int. Cl.
G08G 1/04 (2006.01)
G08G 1/16 (2006.01)
B60W 30/14 (2006.01)
G01S 15/931 (2020.01)

(52) U.S. Cl.
CPC ............. *G08G 1/167* (2013.01); *G08G 1/04* (2013.01); *G01S 2015/937* (2013.01)

(58) Field of Classification Search
CPC .......... B60W 30/095; B60W 30/0953; B60W 50/0097; G08G 1/04; G08G 1/167; B62D 53/00
See application file for complete search history.

(56) References Cited

U.S. PATENT DOCUMENTS

| | | | |
|---|---|---|---|
| 9,527,528 B1 * | 12/2016 | Harrison | B62D 13/00 |
| 9,845,043 B1 * | 12/2017 | Webb | B60K 35/80 |
| 12,163,800 B2 * | 12/2024 | White | G01C 21/3667 |
| 2014/0160276 A1 * | 6/2014 | Pliefke | B60R 11/04 348/118 |
| 2014/0172239 A1 * | 6/2014 | Vergara | B60Q 1/247 701/49 |
| 2017/0169703 A1 * | 6/2017 | Carrasco | B60Q 1/46 |
| 2018/0158337 A1 * | 6/2018 | Koravadi | G05D 1/0253 |
| 2021/0354754 A1 * | 11/2021 | Van Poucke | B62D 15/023 |
| 2022/0092984 A1 * | 3/2022 | Couperthwaite | G08G 1/165 |
| 2022/0230544 A1 * | 7/2022 | Niewiadomski | B62D 15/0295 |

OTHER PUBLICATIONS

Alghooneh et al. Vehicle and Trailer Wheel Path Collision Detection and Alert. U.S. Appl. No. 17/659,729, filed Apr. 19, 2022.

* cited by examiner

*Primary Examiner* — Tan Q Nguyen
(74) *Attorney, Agent, or Firm* — Lorenz & Kopf LLP

(57) ABSTRACT

Vehicles and related systems and methods are provided for assisting vehicle operation. A detection service obtains a current object location derived from one or more sensors onboard a vehicle, determines a current deviation metric associated with the current object location based on a relationship between the current object location and a preceding object location derived from the one or more sensors, and classifies the current object location into one of a plurality of different classifications based on the current deviation metric value, where a primary subset of object locations has respective values for the deviation metric that are less than a threshold. The detection service monitors a predicted path associated with the vehicle with at least the most recent object location of the primary subset to generate an alert in response to a predicted intersection with the predicted path.

20 Claims, 7 Drawing Sheets

VEHICLE SYSTEMS AND COLLISION DETECTION METHODS WITH OCCLUSION MITIGATION

INTRODUCTION

The technical field generally relates to vehicle systems and more particularly relates to roadway boundary guidance and assistance for automotive applications.

Personal motor vehicles have long been fitted with equipment to tow a trailer behind the vehicle. These trailers may include camping trailers, boat trailers or utility trailers. These trailers are typically physically connected to a vehicle trailer hitch mechanically fixed to a towing vehicle frame. The trailers are connected to the trailer hitch with a hitch arrangement coupled to a frame of the trailer. In addition, electrical connections are provided between the towing vehicle and the trailer to supply electrical power to trailer lighting and braking systems, as well as to couple electronic signals to control the application of the trailer brakes and illumination of various trailer lights, such as brake lights, turn signal lights, reverse lights and the like.

Difficulty arises in that during a trailering operation, a trailer path may be outside that of the tow vehicle path. During cornering, the trailer wheels often follow a path inside the wheels of the towing vehicle and trailer wheel contact may occur with curbs if the tow vehicle does not make a wide enough turn. This contact may cause damage to the trailer, the trailer wheels, and/or the curb. In addition, other parts of the trailer may contact objects that the towing vehicle has successfully avoided. It would be desirable to provide a means for providing feedback to a tow vehicle and/or a tow vehicle operator while overcoming the aforementioned problems, for example, by providing a warning to a vehicle system algorithm or a vehicle operator when a trailer path appears likely to encounter a curb or other roadway boundary. However, environmental conditions and various other factors can impair the ability to accurately and reliably provide such guidance.

SUMMARY

Apparatus for a vehicle and related methods for assisting vehicle operation are provided. An exemplary method involves obtaining, by a processor associated with a vehicle, a current object location derived from one or more sensors onboard the vehicle, determining, by the processor, a current value for a deviation metric associated with the current object location based on a relationship between the current object location and a preceding object location derived from the one or more sensors at a preceding sampling time, classifying, by the processor, the current object location into a respective one of a plurality of different classifications based on the current value for the deviation metric, the plurality of different classifications including a primary subset of object locations having respective values for the deviation metric less than a first threshold, and monitoring, by the processor, a predicted vehicle path with respect to one or more object locations of the primary subset to generate an alert when the predicted vehicle path intersects the one or more object locations.

In one aspect of the method, the processor determines a value for a noise metric based on the respective values for the deviation metric associated with a preceding set of object locations, the preceding set of object locations including the current object location and the one or more object locations of the primary subset of object locations, and disables the alert when the value for the noise metric is greater than a suppression threshold. In another aspect, classifying the current object location involves classifying the current object location into the primary subset when the current value for the deviation metric is less than the first threshold and classifying the current object location into a secondary subset of object locations when the current value for the deviation metric is greater than the first threshold, the secondary subset of object locations including one or more respective object locations having respective values for the deviation metric greater than the first threshold. In a further aspect, the method involves swapping the primary subset and the secondary subset when a first number of object locations classified into the secondary subset is greater than a second number of object locations classified into the primary subset.

In another aspect, obtaining the current object location involves obtaining a current curb detection vector having a first plurality of spatial points corresponding to a detected edge based on a fusion of a most recent image data sample from an image sensor onboard the vehicle and a most recent distance measurement data sample from a distance sensor onboard the vehicle, wherein the preceding object location includes a preceding curb detection vector having a second plurality of spatial points corresponding to a preceding detected edge based on a preceding fusion of a preceding image data sample from the image sensor onboard the vehicle and a preceding distance measurement data sample from the distance sensor onboard the vehicle.

In a further aspect, determining the current value involves determining a distance between the current curb detection vector and the preceding curb detection vector and classifying the current object location involves classifying the current curb detection vector into a primary subset of curb detection vectors when the distance is less than the first threshold. In one aspect, monitoring the predicted vehicle path involves identifying a potential contact event when the predicted vehicle path intersects a path defined by the first plurality of spatial points of the current curb detection vector.

In another aspect, the method involves determining, by the processor, a value for a noise metric based on respective distances between successive curb detection vectors of a preceding set of curb detection vectors, the preceding set of curb detection vectors including the current curb detection vector and the preceding curb detection vector and the respective distances including the distance between the current curb detection vector and the preceding curb detection vector, and suppressing generation of the alert in response to the potential contact event when the value for the noise metric is greater than an alert suppression threshold. In another aspect, the method involves predicting a tow vehicle path based at least in part on a steering angle associated with the vehicle and a vehicle location associated with the vehicle and predicting a trailer wheel path based at least in part on the tow vehicle path, a dimension associated with the vehicle and a trailer dimension, wherein monitoring the predicted vehicle path involves identifying a potential contact event when the trailer wheel path intersects a boundary defined by the first plurality of spatial points of the current curb detection vector. In another aspect, the image sensor is a side camera, and the distance sensor is a side ultrasonic sensor.

An apparatus for a vehicle is also provided. The vehicle includes a side camera to obtain image data, a side distance sensor to obtain distance measurement data, a user interface to provide an alert to an operator of the vehicle, and a processor coupled to the side camera, the side distance sensor and the user interface. The processor is configurable to identify a current curb detection vector based at least in part on the image data and the distance measurement data, determine a current value for a deviation metric associated with the current curb detection vector based on a relationship between the current curb detection vector and a preceding curb detection vector derived from a preceding sampling of the image data and the distance measurement data at a preceding sampling time, classify the current curb detection vector into a primary bin of curb detection vectors when the current value for the deviation metric is less than a threshold, classify the current curb detection vector into a secondary bin of curb detection vectors when the current value for the deviation metric is greater than the threshold, and monitor a predicted path associated with the vehicle with respect to at least a most recent curb detection vector of the primary bin of curb detection vectors to generate the alert in response to a predicted intersection with the predicted path.

In one or more implementations, the processor is configurable to determine a value for a noise metric associated with the current curb detection vector based at least in part on the current value for the deviation metric and a respective value for the deviation metric associated with the preceding curb detection vector and disable the alert when the value for the noise metric is greater than an alert suppression threshold. In another implementation, the processor is configurable to swap designations of the primary bin and the secondary bin when a first number of curb detection vectors classified into the secondary bin is greater than a second number of curb detection vectors classified into the primary bin.

In one aspect, the current curb detection vector includes a first plurality of spatial points corresponding to a detected edge based on a fusion of a first current sample of the image data and a second current sample of the distance measurement data. In a further aspect, the preceding curb detection vector includes a second plurality of spatial points corresponding to a second detected edge based on a preceding fusion of a preceding sample of the image data and a preceding sample of the distance measurement data and the current value for the deviation metric is influenced by a distance between the first plurality of spatial points and the second plurality of spatial points. In one or more implementations, the processor is configurable to determine a value for a noise metric associated with the current curb detection vector based at least in part on the distance between the first plurality of spatial points and the second plurality of spatial points and preceding distances between successive curb detection vectors and disable the alert when the value for the noise metric is greater than an alert suppression threshold.

An apparatus for a non-transitory computer-readable medium is provided. The computer-readable medium has stored thereon executable instructions that, when executed by a processor, cause the processor to provide a detection service configurable to obtain a current object location derived from one or more sensors onboard a vehicle, determine a current value for a deviation metric associated with the current object location based on a relationship between the current object location and a preceding object location derived from the one or more sensors at a preceding sampling time, classify the current object location into a respective one of a plurality of different classifications based on the current value for the deviation metric, the plurality of different classifications including a primary subset of object locations having respective values for the deviation metric less than a first threshold, and monitor a predicted vehicle path with respect to one or more object locations of the primary subset to generate an alert when the predicted vehicle path intersects the one or more object locations.

In one aspect, the detection service is configurable to determine a value for a noise metric based on the respective values for the deviation metric associated with a preceding set of object locations, the preceding set of object locations including the one or more object locations of the primary subset of object locations and disable the alert when the value for the noise metric is greater than an alert suppression threshold. In another aspect, the detection service is configurable to classify the current object location into the primary subset when the current value for the deviation metric is less than the first threshold and classify the current object location into a secondary subset of object locations when the current value for the deviation metric is greater than the first threshold, wherein the secondary subset of object locations includes one or more respective object locations having respective values for the deviation metric greater than the first threshold. In another aspect, the detection service is configurable to swap the primary subset and the secondary subset when a first number of object locations classified into the secondary subset is greater than a second number of object locations classified into the primary subset.

BRIEF DESCRIPTION OF THE DRAWINGS

The exemplary aspects will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
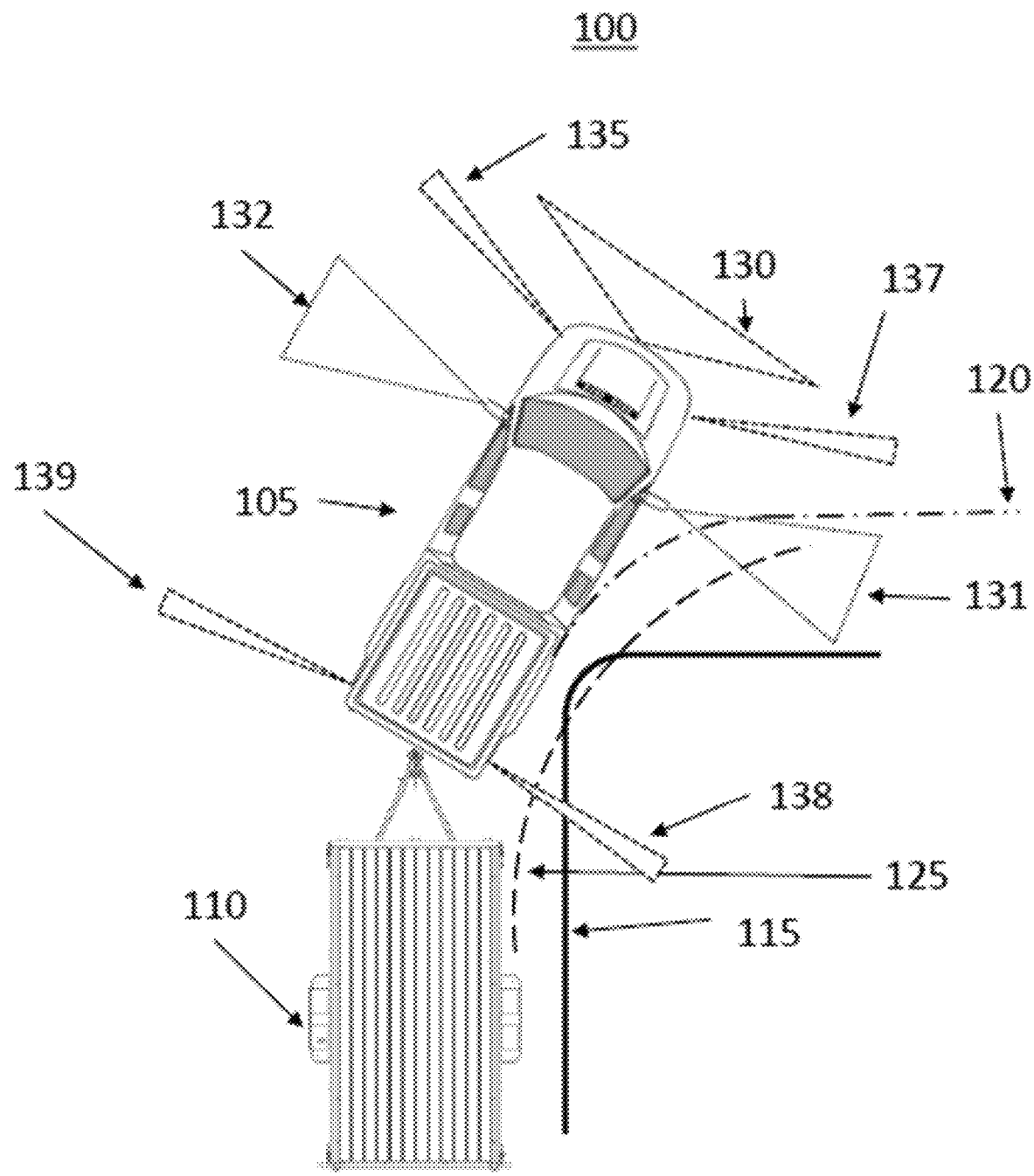
FIG. 1 shows an exemplary environment for use of the trailer path hazard detection system according to an embodiment of the present disclosure.

FIG. 1 depicts an environment 100 for use of a trailer path hazard detection system according to an exemplary implementation. The exemplary environment 100 depicts a towing vehicle 105 and a trailer 110. The towing vehicle 105 may be equipped with optical imaging sensors, for example a front view camera having a camera field of view (FOV) 130, a right side view camera having a right side FOV 131, a left side camera having a left side FOV 132, and range imaging sensors, for example, a front left ultrasonic sensor having a front left ultrasonic detection zone 135, a front right ultrasonic sensor having a front right ultrasonic detection zone 137, a rear left ultrasonic sensor having a rear left ultrasonic detection zone 139 and a rear right ultrasonic sensor having a rear right ultrasonic detection zone 138.

It is desirable to vehicle operators to keep vehicles and trailers from being scratched or damaged. One source of damage to vehicles and trailers wheels is damage from curbs and parking blocks primarily caused by contact of the wheel rim with the curb while turning. The exemplary system is configured to perceive curb hazards and estimate a vehicle wheel path 120 with relation to curb and other object hazards that can occur and provide guidance to the driver to help prevent collisions. The exemplary system is configured to perceive curb hazards and estimate a trailer wheel path 125 with relation to curb and other object hazards that can occur and provide guidance to the driver to help prevent collisions during trailering operations. The exemplary system may employ a fusion of vehicle perception sensors, including optical image sensors such as cameras, and range imaging sensors such as ultrasonic sensors, lidar, or short range radar, and other vehicle kinematic and dynamic data along with algorithms to detect, localize, track, and alert curb hazards and other hazardous objects inside the turning radius of the trailer.

In some exemplary embodiments, a tow vehicle 105 is configured with a system to perceive curbs and other hazards proximate to the tow vehicle 105 and trailer 110 when performing a trailering operation. The exemplary system determines if the vehicle wheels or trailer wheels or other parts of the trailer may contact a curb 115 or another hazard. If so, the exemplary system then provides guidance to a vehicle operator or a vehicle control system to help prevent these contact events and subsequent damage to the vehicle 105 or trailer 110.

The exemplary system may incorporate a number of perception sensors including optical imaging sensors for example front and side cameras, and range imaging sensors for example ultrasonic sensors or short-range radars, along with a processor, an algorithm, and customer interface. In some exemplary embodiments, the tow vehicle 105 may be equipped with ultrasonic sensors on the front corner and rear corner of the tow vehicle 105 used to detect and localize a curb and/or other objects next to the tow vehicle 105. The tow vehicle 105 is further equipped with one or more forward view cameras having a forward field of view 130 and left and right side view cameras having a left side field of view 132 and a right side field of view 131.

In some exemplary embodiments, the system may be configured to perform a sensor fusion of the detections of each of the sensors to generate a local area map referenced to the tow vehicle 105. As the tow vehicle 105 moves, the local area map is updated with newly acquired information and existing information is confirmed or updated in response to subsequent sensor data. Combining data from several sources using multi-sensor data fusion algorithms exploits data redundancy to reduce object location uncertainty. In some exemplary embodiments, the sensor data may be fused using Bayesian fusion algorithms with Kalman filtering.

The system may further perform an estimation model to detect and localize a curb or objects inside the curb by fusing two set of complementary on-board vehicle sensors, including optical imaging sensors such as surrounding cameras, and range imaging sensors such as ultrasonic sensors. The estimation model may use a camera-based algorithm to capture and map front and side views from the tow vehicle 105 and then fuses side ultrasonic sensors with the front view and side view cameras using a model-based or non-model-based Bayesian filtering. In some exemplary embodiments, the curb hazards or obstacles that were detected using the fusion of cameras, and ultrasonic sensors, may be combined to generate a map of the area around the tow vehicle 105.

The system may be further configured to monitor tow vehicle and trailer telemetry, such as tow vehicle steering angle and velocity. In response to the telemetry, the system is then configured to predict the tow vehicle and trailer odometry in response to the telemetry.

This tow vehicle and trailer odometry maps the predicted tow vehicle wheel path 120 and/or predicted trailer wheel path 125. This predicted trailer wheel path 125 may be compared to detected obstacles and curbs on the local map. If a contact event is predicted in response to the predicted trailer wheel path 125, an alert may be transmitted to the vehicle operator via a user interface, such as an audible alert, warning light, seat vibration, or a graphic on an in-vehicle cabin display.

A landmark estimation model may be further employed to enhance the estimation model through the local odometry algorithm that fuses multiple on-board sensors such as GPS, IMU, wheel pulses, steering angles. The exemplary algorithm may use local odometry to spatiotemporal stamp the landmarks, and as a result generate a local map of the recently seen landmarks. The algorithm may then utilize a kinematics/dynamics model of the tow vehicle 105 with/without the trailer 110 to estimate the projected path of the tow vehicle 105 or trailer wheels and to assess that whether that path would collide with the detected landmarks in the local map. The path guideline is annotated on the viewing system for the feature to interact with the driver. The path guideline may adapt and change with changes in the steering direction and hitch articulation angle.

The exemplary system may further include a user interface for providing feedback to a vehicle operator, such as audible chimes, displays, and haptic feedback when a potential hazard is detected. For example, guidelines may be displayed to a vehicle operator where guideline color may represent likelihood of a potential collision between the trailer wheels and curb based on the distance of the wheels to the curb as well as the time to collision of the wheels to the curb.

Figure 2:
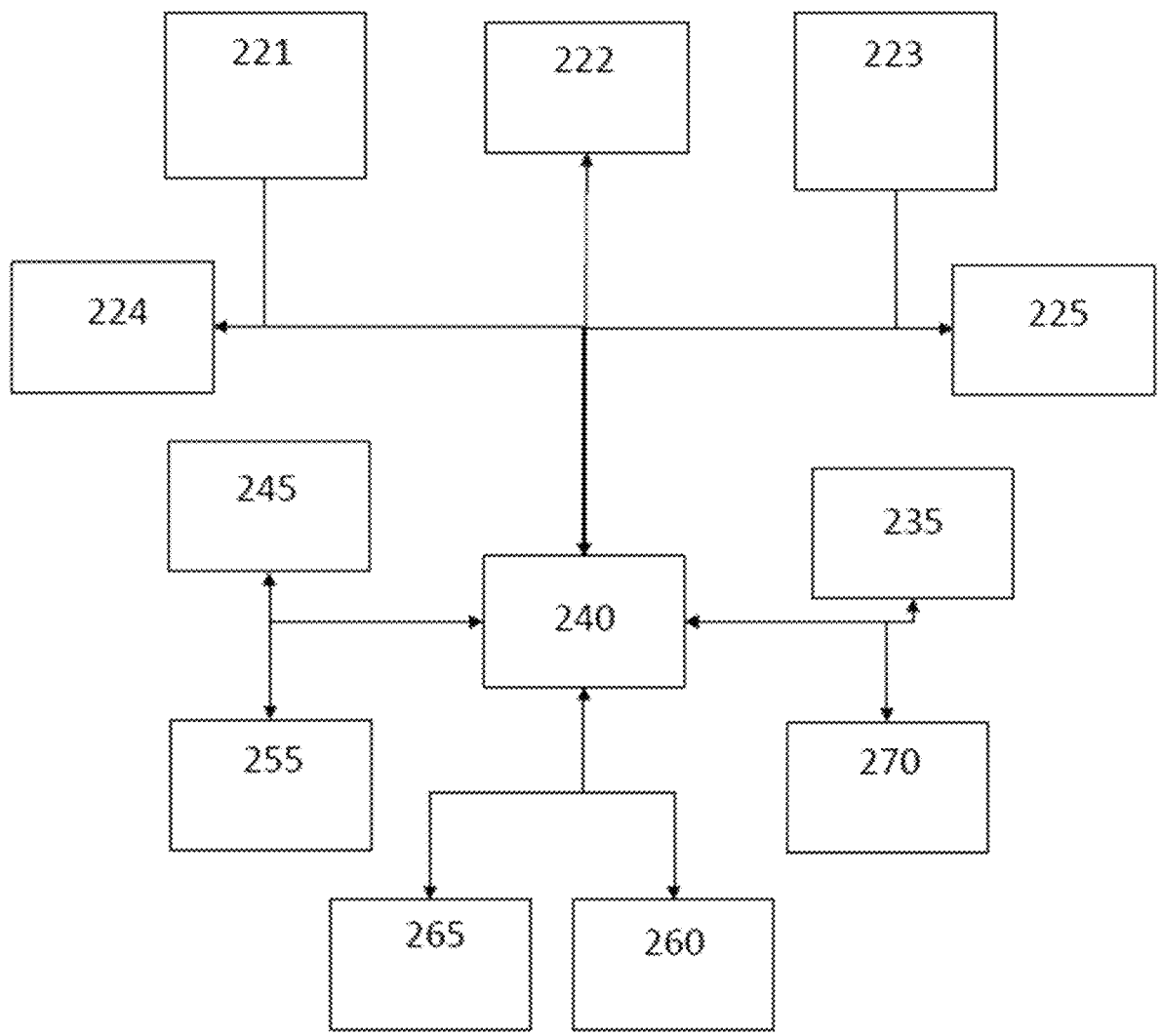
FIG. 2 shows a block diagram illustrating a system for implementing the trailer path hazard detection system according to an exemplary embodiment of the present disclosure.

Turning now to FIG. 2, a block diagram illustrating a system 200 for implementing a trailer path hazard detection system according to an exemplary embodiment of the present disclosure is shown. The exemplary system 200 may be located in a towing vehicle and include a processor 240, a left side range imaging sensor 221, a right side range imaging sensor 223, a left side optical sensor 224, a right side optical sensor 225, a camera 222, a global positioning system (GPS) sensor 245, an inertial measurement unit (IMU) sensor 235, a vehicle controller 270, a user interface 260, a memory 265 and a trailer interface 255.

The camera 222 may be a front facing camera installed on a forward portion of the towing vehicle, such as a front facia or behind a rear view mirror. The camera 222 may include one or more image sensors for capturing a forward facing field of view from the front of the towing vehicle. In some exemplary embodiments images captured by the camera 222, the left side optical sensor 224 and/or the right side optical sensor 225 may be fused to generate a combined image of an area proximate to the tow vehicle.

If more than one image sensor is used, a stereo image may be generated. Image processing algorithms may be performed on the stereo image to estimate depth information in the forward field of view. One or more images captured by the camera 222 may then be coupled to the processor 240. In addition, the exemplary system may include one or more side optical sensors, such as a left side optical sensor 224, a right side optical sensor 225, used to capture images and/or determine depth information for left and right sides of the vehicle and/or trailer.

The left side range imaging sensor 221 and the right side range imaging sensor 223 may be range imaging sensors and/or depth sensors configured to transmit a pulse, receive a reflection of the pulse and estimate a distance to a vertical surface of an object, such as a curb or other obstacle, in response to the propagation time of the transmitted pulse. The left side range imaging sensor 221 and the right side range imaging sensor 223 may have fields of view orthogonal to the centerline of the tow vehicle and may be oriented such that the field of view cover an expected location of a curb or other objects proximate to the side of the tow vehicle. In some exemplary embodiments, the left side range imaging sensor 221 and the right side range imaging sensor 223 may be ultrasonic sensors configured to transmit ultrasonic audio pulse. The distance to a curb or object may be estimated in response to the propagation time of the ultrasonic audio pulse. Alternatively, the left side range imaging sensor 221 and the right side range imaging sensor 223 may be lidar sensor, radar, or other range sensing device.

The GPS 245 is configured to receive a plurality of time stamped satellite signals including the location data of a transmitting satellite. The GPS sensor 245 then uses this information to determine a precise location of the GPS sensor 245. The processor 240 may be operative to receive the location data from the GPS sensor 245 and/or store this location data to the memory 265. The memory 265 may be operative to store map data for use by the processor 240.

The IMU 235 is a device used to report a specific force of a body, such as the angular or linear acceleration of the body to which it is attached. The IMU 235 may measure angular or linear acceleration and may be used to determine a lateral acceleration, a longitudinal acceleration, a yaw rate and pitch of a vehicle. The IMU 235 is mounted within the tow vehicle and is operative to generate a control signal indicative of the measured specific forces and to couple this control signal to the processor 240.

The user interface 260 may be operative to provide a human machine interface between the vehicle control system and the driver. The user interface 260 may be a touch sensitive display screen, a display, one or more buttons, dials, switches, etc., and or one or more light emitting diodes, audio generation devices, such as a speaker, or other indicators. The user interface 260 is operative to receive user requests such as a request for activating a vehicle system, such as settings for an ADAS operation. In an exemplary embodiment, the user interface 260 may be operative to receive an activation of a trailering mode in a tow vehicle in response to a user input. The user interface 260 may be further configured to display user alerts if a vehicle or trailer contact event is predicted. The user interface 260 may display a predicted tow vehicle path and/or a predicted trailer path on a display within the tow vehicle cabin. The user interface 260 may be configured to receive trailer dimension and/or configuration information in response to a user input or may initiate a trailer dimension estimation algorithm in response to a user input.

In some exemplary embodiments, the user interface 260 may provide audible and/or visual warnings to a driver which are intensified in response to time to collision and/or distance to collision. For example, as a projected trailer wheel path passes within a threshold distance to a curb or other object, the color of a displayed trailer wheel path indicator may change from green to yellow, or from yellow to red. An audible alert may be generated by the user interface 260 in response to the projected trailer wheel path passing within a threshold distance to a curb or other object. An amplitude or frequency of an audible alert may be altered in response to a changed in distance between a projected wheel path and an obstacle such as a curb.

The vehicle controller 270 may be operative to control the vehicle operations in response to a control algorithm or the like. In an exemplary embodiment, the vehicle controller 270 may be operative to generate vehicle control signals for coupling to a throttle controller, a brake controller, and a steering controller or the like for control of the vehicle in response to an advanced driver assistance system (ADAS) algorithm or in response to a vehicle operator input via a steering wheel, vehicle pedals, and the like. The vehicle controller 270 may further be operative to generate system control signals for coupling to the processor 240, indicative of such information as speed of the vehicle, acceleration, vehicle motion cycles, vehicle operator input state, trailer etc.

The trailer interface 255 may be a module within the tow vehicle configured to receive and transmit control signals and/or data to the trailer. The trailer interface 255 may be electrically coupled to a trailer connector socket. The socket may be a 7 pin electrical socket with each of the pins separately electrically coupled to the trailer interface 255. The socket is configured for receiving a plug that is electrically coupled to a wiring system of the trailer with an electrical cord long enough to stay affixed to the socket on the towing vehicle while accommodating the movement of the trailer during towing operations. In some exemplary embodiments, the trailer interface 255 may be configured to detect the insertion of the plug into the socket. This detection may be made in response to a change in capacitance or voltage on one or more of the electrical connections to the socket. For example, the trailer interface 255 may detect a change in voltage on the ground pin of the socket. Alternatively, the insertion may be detected in response to a change of state of a physical switch, such as a button switch being depressed by the plug as the plug is inserted into the socket.

The processor 240 is configured to perform the trailer path hazard detection algorithm. In response to the image data received from the camera 222 and depth map information received from each of the left side range imaging sensor 221 and the right side range imaging sensor 223, the processor 240 is first configured to generate a local area map of objects and roadway features, such as curbs, proximate to the tow vehicle. The processor 240 may augment this local area map with map data stored in the memory 265 or map data received from other sources. The local area map is continuously updated as image data and depth information are received. The location of the tow vehicle and the trailer are localized within the local area map such that distances between the detected obstacles, the tow vehicle position and the trailer position may be determined.

The processor 240 is further configured to receive vehicle telemetry data, such as vehicle speed, steering angle, braking information and the like, from the vehicle controller 270. The processor 240 may further receive acceleration data from the IMU 235. In response to the telemetry data and the acceleration data, the processor 240 is configured to estimate an anticipated tow vehicle path. In response to the anticipated tow vehicle path, hitch articulation angle, tow vehicle geometry and trailer geometry and measurements, the processor 240 next predicts an anticipated trailer path. The anticipated tow vehicle path and the anticipated trailer path are compared with the map data and possible contact events with the tow vehicle, the trailer, or the trailer wheels are predicted. If a possible contact event is predicted, an alert control signal is generated and coupled to the user interface 260 and/or the vehicle controller 270. In some exemplary embodiments, the possible contact event may be based on the distance of the wheels to the curb as well as the time to collision of the wheels to the curb. The vehicle controller 270 may provide the alert control signals as information to an ADAS algorithm for assisted or autonomous vehicle operation.

In some exemplary embodiments, the processor 240 may first receive an image and/or image data from the camera 222 depicting the forward field of view from the tow vehicle. The processor 240 may then perform edge detection techniques, or other image processing techniques, to estimate the location of curbs proximate to the tow vehicle. The processor 240 may subsequently receive depth data from the left side range imaging sensor 221 and the right side range imaging sensor 223 generated in response to a pulse reflection from one or more vertical surfaces and confirm the location of the curbs. This confirmed information is stored as a map data in the memory 265 or other accessible memory. The processor 240 may then predict a trailer path in response to trailer measurements and tow vehicle telemetry. In response to the predicted trailer path, the processor 240 may next predict any possible contact events between the tow vehicle, tow vehicle wheels, and/or trailer wheels and the curb. If a contact event is predicted, a warning signal is coupled from the processor 240 to the user interface 260 in order to alert a vehicle operator to the possible contact event.

In some exemplary embodiments, a top view of the tow vehicle and the trailer may be generated from various cameras around the tow vehicle and/or the trailer. A tow vehicle image and a trailer image may be overlaid on the top view as well as indicators of the predicted tow vehicle path and the predicted trailer path. Curbs, roadway indicators, and other objects may be highlighted or indicated on the top down view with additional overlays. Predicted contact points may be indicated on the top down view. For example, possible contact points may be highlighted in a color, such as red, be indicated by an icon, such as an explosion icon, or may be otherwise indicated to the vehicle operator.

Figure 3:
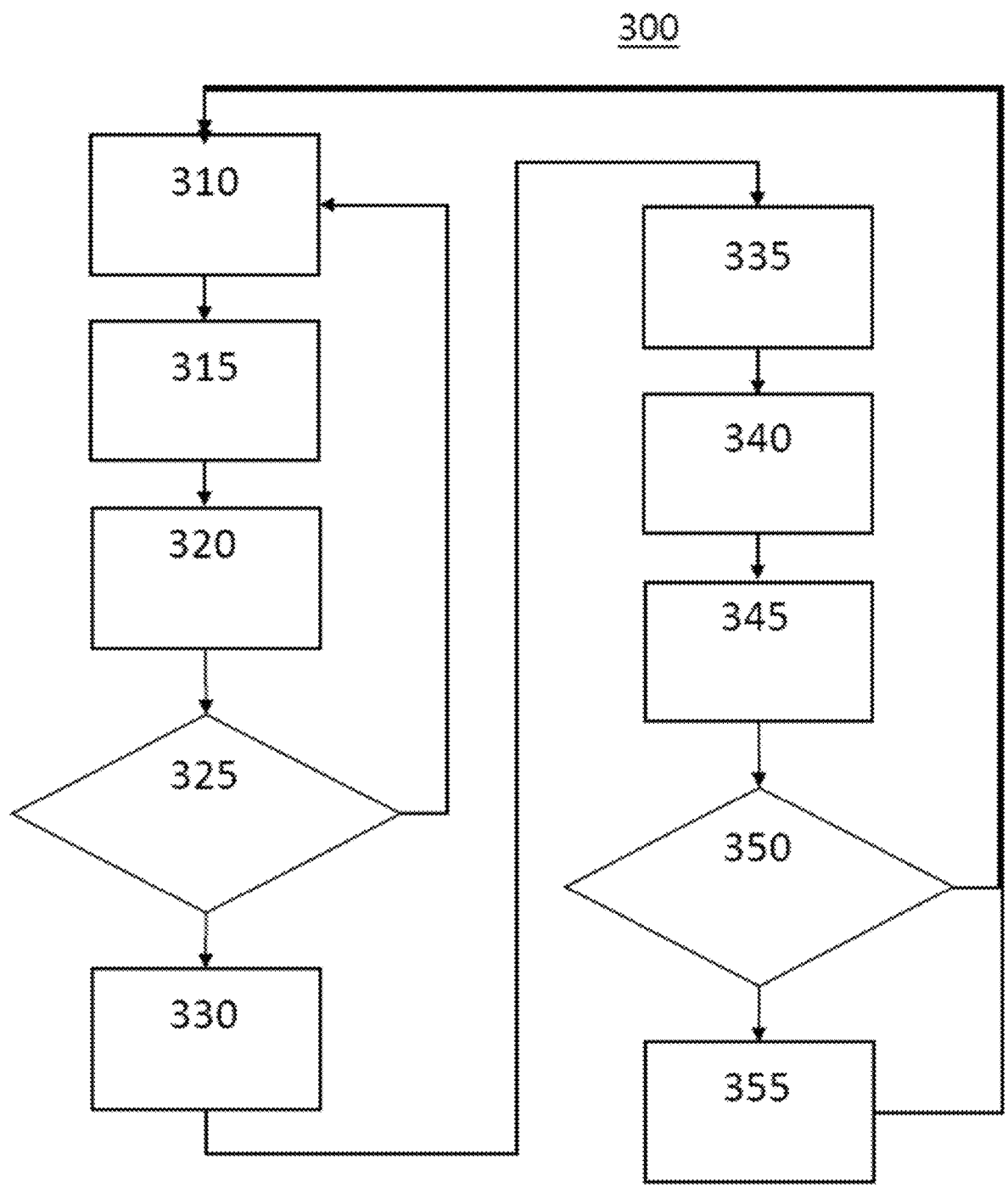
FIG. 3 shows a flow chart illustrating an exemplary method for controlling the trailer path hazard detection system according to an exemplary embodiment of the present disclosure.

Turning now to FIG. 3, a flow chart illustrating an exemplary method 300 for controlling a trailer path hazard detection system according to an exemplary embodiment of the present disclosure is shown.

The method is first configured to receive 310 an image from a camera mounted to the tow vehicle. The camera may be a wide angle camera having a forward field of view from the tow vehicle, or may be a wide angle camera having a side field of view from the tow vehicle. In some exemplary embodiments, the camera may include a plurality of image sensors capable of capturing a stereo image wherein depth information may be determined for objects within the stereo image. The image, or a series of images captured at regular time intervals, may be then coupled to an image processor. In some exemplary embodiments, the processor may be configured to detect horizontal edges or lines within the image which may be indicative of a curb.

The method is next operative to detect 315 objects within the captured image or plurality of images. The method may use sequential images captured at different times to estimate distances to objects using the parallax within the images caused by movement of the tow vehicle. In some exemplary embodiments, the imaged may be converted to grayscale, an inverse perspective mapping performed, followed by image smoothing. Canny edge detection may be used to detect edges within the image, such as curbs, light posts, etc. A Hough transform may also be employed to extract features from the images to detect instances of edges or other shapes.

The method is next operative to receive 320 depth information from the side view sensors having a side field of view near the front of the towing vehicle. These side view sensors may include ultrasonic sensors, cameras, lidar, radar, or the like. In some exemplary embodiments, the side view sensors are configured to generate depth maps of their respective fields of view and to couple these depth maps to the processor. The depths may be indicative of a distance from the side view sensor to a vertical surface. In some exemplary embodiments, depth information is coupled to the processor, such as two dimensional depth information that is captured at regular time intervals with the movement of the tow vehicle. For example, the field of view may be a vertical fan shape returning a plurality of depths at varying elevations with a single azimuth. The movement of the tow vehicle enables a variation in the azimuth measurements used to generate the depth map.

The method is next operative to confirm 325 object locations detected from the image using the received depth information from the side view sensors. For example, a horizontal edge detected in the image may be correlated with a vertical edge detected in response to the depth information to estimate a location of a curb. If the object location is not confirmed, the method returns to receive 310 the next image. If the location is confirmed, the method then updates 330 a map information stored in a memory.

The method is configured to update 330 the map with object locations in response to a landmark estimation model that fuses the front view captured by the camera and the depth information captured by the side view sensors using Bayesian filtering. The stored map coverage may be cropped in response to the tow vehicle position. For example, the method may store map information for a predetermined radius around the tow vehicle, discarding object information once the object falls out of the predetermined radius.

The method is next configured to receive 335 telemetry information from the tow vehicle controller or other tow vehicle sensors. The telemetry information may include vehicle velocity, location, speed, steering angle, brake application level, various accelerations detected by a vehicle IMU or the like. The landmark estimation model may be further enhanced through the local odometry algorithm that fuses multiple on-board sensors such as GPS, IMU, wheel pulses, steering angles using Bayesian filtering.

The method next predicts 340 a tow vehicle path in response to the received telemetry information. The tow vehicle path is predicted using the local map and a kinematics/dynamics model of the tow vehicle to estimate the projected path of the vehicle. The method next uses the predicted tow path, the trailer dimensions and, in some exemplary embodiments, the hitch articulation angle, to predict 345 the trailer path. Specifically, the method may predict the trailer wheel paths.

The method next predicts 350 possible contact events in response to the map data and the predicted trailer path. In some exemplary embodiments, the trailer path hazard detection algorithm may assess whether the trailer wheel path may intersect with the detected landmarks in the local map. If no intersection is predicted, indicating that a contact event will not occur, the method is configured to return to receiving 310 the next image.

If a contact event is predicted, the method is next configured to generate 355 an alert to provide to the vehicle operator or a vehicle control system performing an ADAS algorithm. For an alert provided to the vehicle operator, a projected trailer path guideline may be annotated on a graphical user interface of a vehicle cabin display. In some exemplary embodiments, the path guideline may be adaptive and changing location with respect to an indicated obstacle with change in the steering wheel and hitch articulation angle. For example, a curb may be indicated on the display and the projected trailer wheel path may also be projected. As the projected trailer wheel path approaches the curb location, the indicated projected trailer wheel path gets closer to the curb indicator and the color of the indicated projected trailer wheel path may change color to highlight the increased likelihood of a contact event. An audible alert, haptic alert, or other vehicle operator warning may be generated when a distance to an intersection between the projected trailer wheel path and the obstacle reaches a threshold distance. After the alert is generated, the method returns to receiving 310 a subsequent image.

In some exemplary embodiments, the method utilizes the vehicle odometry model to create a spatiotemporal map of the recently seen landmarks, by fusing sensors included but not limited to cameras, ultrasonics (and/or short range radars), vehicle dynamics and kinematics sensors and model included but not limited to steering wheel angle, GPS, IMU, wheel encoder. The method fuses the spatiotemporal map of the landmarks as well as the projected/predictive trajectory of the vehicle/trailer wheels developed to assess whether the vehicle wheels are about to collide with these landmarks, based on distance of the wheels to the landmarks or time to collision of the wheels to the landmarks or a combination of both.

The method may determine the projected or predictive trajectory of the vehicle/trailer wheels by utilizing the vehicle/trailer model including, but not limited to, dynamics or kinematics model as well as the vehicle on-board sensors including but not limited to the steering wheel angle and IMU, along with the hitch articulation angle between the vehicle and trailer and other vehicle and trailer dimensions. The vehicle operator user interface and/or feedback system may utilize the assessment and provide feedback to the driver that may include for example audible chimes, displays, and haptic feedback when a potential hazard is detected. Examples include, but are not limited to, guideline color represents potential collision between the trailing wheels and curb based on the distance of the wheels to the curb as well as the time to collision of the wheels to the curb.

Figure 4:
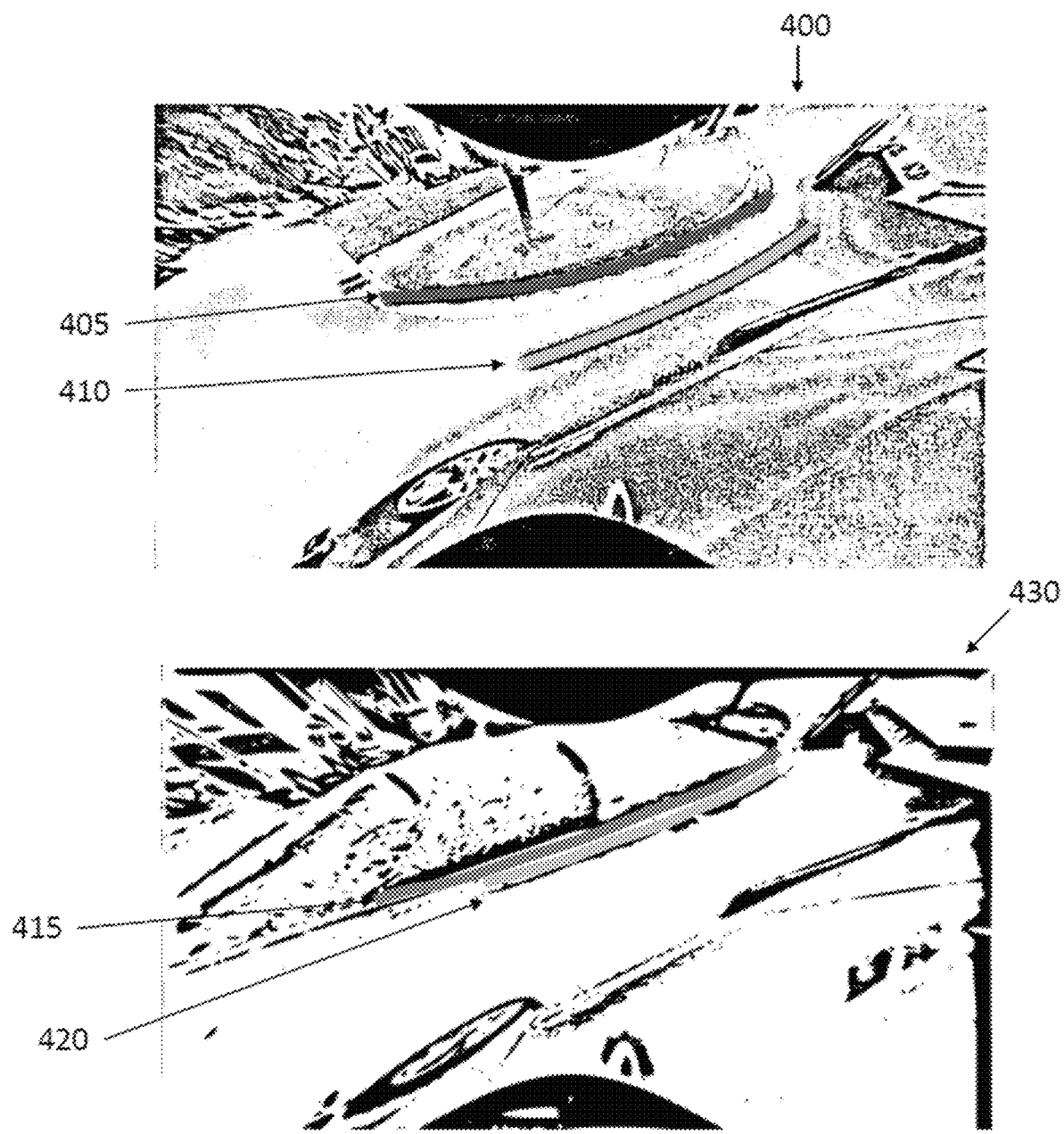
FIG. 4 shows a user interface display for providing driver feedback from trailer path hazard detection system according to an exemplary embodiment of the present disclosure.

Turning now to FIG. 4, an exemplary user interface display for providing driver feedback from trailer path hazard detection system according to an exemplary embodiment of the present disclosure is shown. The first image 400 is indicative of a side view from the tow vehicle where the tow vehicle is beginning to execute a right turn around a corner during a towing operation. The detected curb is highlighted by the system by overlaying a first indicator 405 over the detected curb. A trailer guideline 410 is also overlaid on the user interface image to identify to the driver the projected trailer wheel path. The first indicator 405 and the trailer guideline 410 may be depicted in different colors on the user interface image. In some exemplary embodiments, as the turn progresses and where the projected trailer wheel path is approaching the curb, the color of the trailer guideline may change colors to communicate the increased risk of curb collision to the vehicle operator.

The second image 430 is indicative of a turn where the projected trailer wheel path is close to contacting the curb. In some exemplary embodiments, the curb indicator 415 and the trailer guideline 420 are show as nearly overlapping on the user interface image. In some exemplary embodiments, the color of the trailer guideline may again change color to communicate the imminent curb collision to the vehicle operation. In addition, additional alerts may be provided to the vehicle operation, such as a haptic alert, audible alert, flashing light emitting diodes, or the like, indicative of the imminent curb collision.

Figure 5:
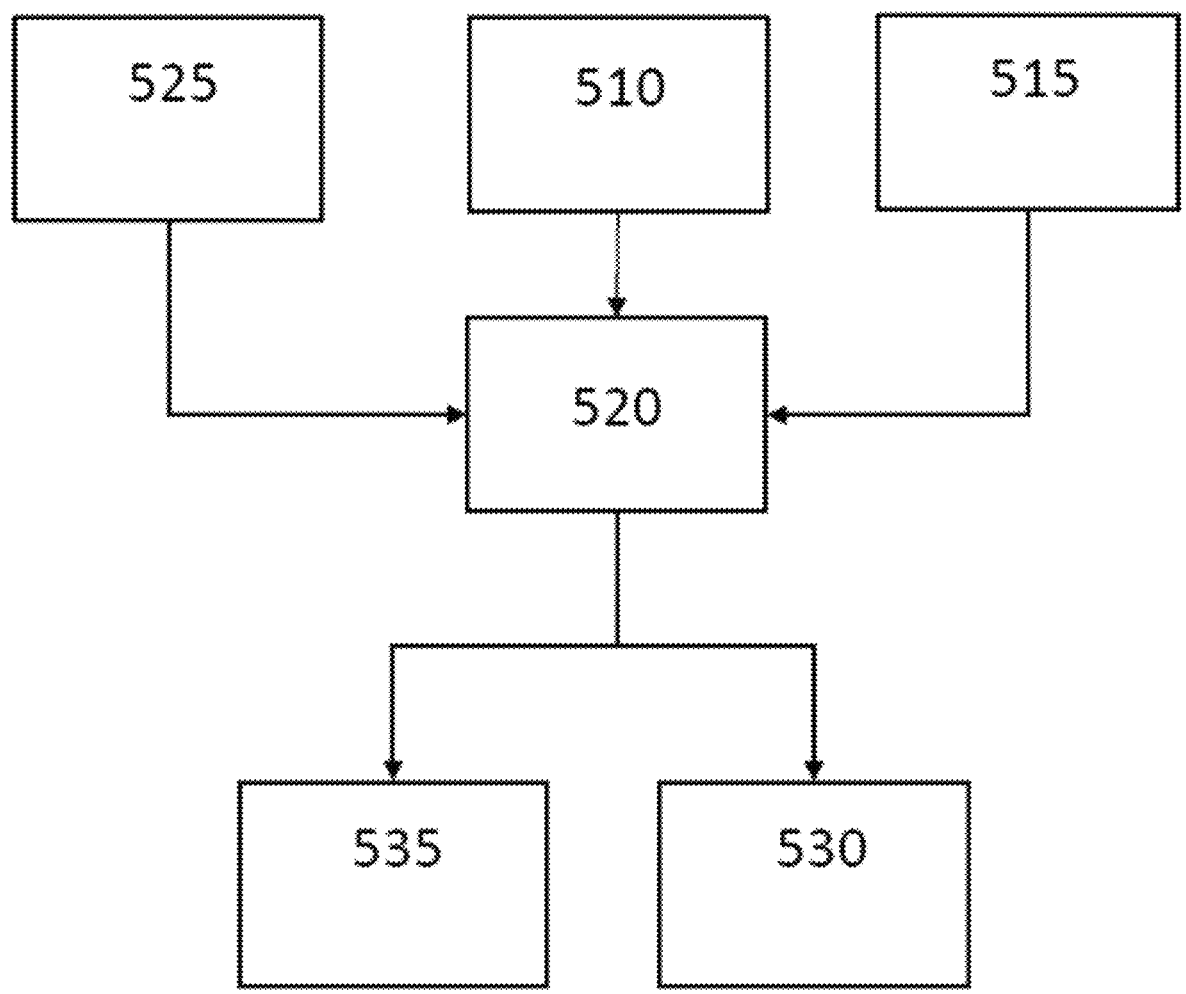
FIG. 5 shows a block diagram illustrating a system for implementing the trailer path hazard detection system according to an exemplary embodiment of the present disclosure.

Turning now to FIG. 5, a block diagram of a trailer path hazard detection system 500 according to an exemplary embodiment of the present disclosure is shown. The exemplary system may include a camera 510, a distance sensor 515, a processor 520, a location sensor 525, a memory 535 and a user interface 530.

The camera 510 may be configured for capturing an image of a field of view including an object. In some exemplary embodiments, the object is a curb. The obstacle may be another obstacle, such as a traffic sign, safety bollard, light post, utility pole, or the like, located close to an edge of the roadway. In some exemplary embodiments, the camera may be a stereo camera for capturing a plurality of stereo images and wherein the object location is determined in response to the plurality of stereo images. The image may be captured in response to a trailer system activation and a detection of a tow vehicle motion.

The distance sensor 515 is configured for determining a distance to the object. The distance sensor 515 may have a side facing field of view and may determine the distance to the object at a different time than when the image of the object was captured with the camera. These detections at different times may be correlated using the tow vehicle locations at the different times to confirm the object location and generate a map data in response to the object location. In some exemplary embodiments, the distance sensor 515 may be a side view ultrasonic sensor.

The location sensor 525 is configured for determining a tow vehicle location. The location sensor 525 may be a global positioning sensor and may determine the vehicle location in response to data transmitted from a plurality of satellites. Alternatively, the location sensor may use vehicle to infrastructure (V2I) signals from local infrastructure to determine a tow vehicle location.

The processor 520 is configured for detecting an object location in response to the image and the tow vehicle location. The processor 520 may use image processing techniques such as edge detection to detect the object within the image. The processor 520 may further estimate a distance to the object in response to one or more images and the tow vehicle location.

The processor 520 may be further operative for predicting a tow vehicle path in response to a tow vehicle steering angle and the tow vehicle location. The tow vehicle path may be localized to a map data stored in the memory 535 and added to the map data. The processor 520 may then predict a trailer wheel path in response to the tow vehicle path and a trailer dimension. In some embodiments, the trailer dimension is a distance from a trailer wheel to a trailer hitch point. Alternatively, the trailer dimension may include a plurality of dimensions such as trailer track width, distance from the hitch point to the trailer axle, trailer width, trailer height, trailer length, hitch mechanism length, and hitch articulation angle. The processor may be further configured for generating a warning control signal in response to an intersection of the object location and the trailer wheel path.

The user interface 530 may be configured for displaying a warning in response to the warning control signal. The user interface 530 may be a warning light, a speaker for playing an audible alarm, or a haptic device. The user interface may be a display within a vehicle cabin for displaying one or more images including the curb, for overlying a highlight on the curb, and for displaying an indication of the trailer wheel path.

The exemplary system may further include a memory 535 for storing a map data and wherein the processor is further operative to amend the map data in response to the object location and the tow vehicle location and wherein the trailer wheel path is determined in response to the map data.

In some exemplary embodiments, the trailer path hazard detection system 500 may include a trailer interface for detecting a connection to a trailer, a forward view camera for capturing a first image including a curb, a side view camera for capturing a second image including the curb, a processor for determining a curb location in response to the first image, the second image and a tow vehicle location, predicting a tow vehicle path in response to a tow vehicle steering angle and the tow vehicle location, predicting a trailer wheel path in response to the tow vehicle path and a trailer dimension, and generating a warning control signal in response to an intersection of the obstacle location and the trailer wheel path, and a display for displaying the second image and overlaying a first indicator of the curb location and a second indicator of the trailer wheel path over the second image. The trailer path hazard detection system 500 may further include a speaker to generating an audible alert in response to the warning control signal.

Figure 6:
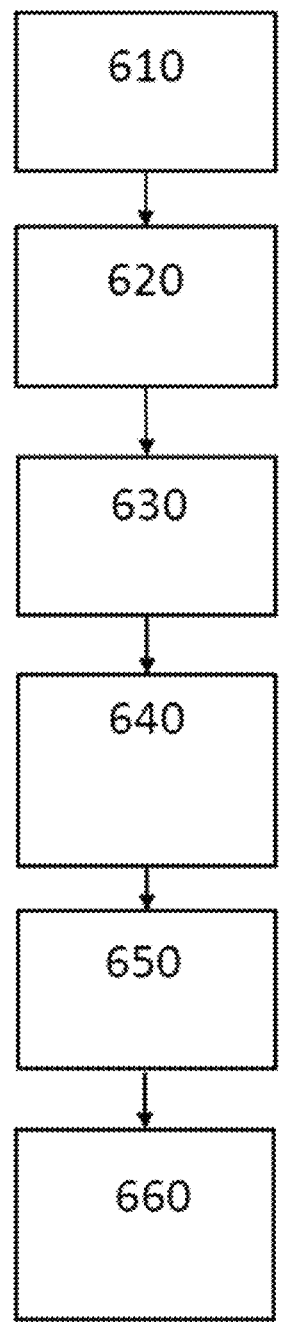
FIG. 6 shows another flow chart illustrating an exemplary method for controlling the trailer path hazard detection system according to an exemplary embodiment of the present disclosure.

Turning now to FIG. 6, a flow chart illustrating an exemplary method 600 for implementing a trailer path hazard detection system according to an exemplary embodiment of the present disclosure is shown. The exemplary method may be performed by a processor within a tow vehicle. The processor may be communicatively coupled to sensors, controllers, and interfaces within the tow vehicle. The processor may further be communicatively coupled to a user interface, such as a vehicle cabin display, a vehicle infotainment system or an application running on a smartphone or the like.

The exemplary method may detect 610 an obstacle location in response to an image where the image is captured by a camera mounted to the tow vehicle. The camera may have a forward field of view from the tow vehicle. In some exemplary embodiments, the obstacle location may be confirmed in response to a depth measurement from a side view sensor mounted to the tow vehicle. The obstacle location may be confirmed in response to a depth measurement from an ultrasonic sensor mounted to the tow vehicle. The image may be captured in response to a trailer system activation and a detection of motion of a tow vehicle.

The method may predict 620 a tow vehicle path in response to a tow vehicle steering angle and a tow vehicle location. In addition, the tow vehicle path may be predicted in response to vehicle telemetry, map data, and location sensor data. For example, the tow vehicle path may be predicted in response to an acceleration detected by an inertial measurement unit affixed to a tow vehicle. In some embodiments, the tow vehicle path may be predicted in response to a displacement detected by a wheel encoder affixed to a tow vehicle.

The method may next predict 630 a trailer wheel path in response to the tow vehicle path and vehicle and trailer dimensions. The vehicle dimension may be the distance from the vehicle rear axle to the trailer hitch point. The trailer dimension may be a distance from a trailer wheel axle to a trailer hitch point and a trailer track width. The trailer wheel path may be predicted in response to a trailer hitch articulation angle.

The method may then compare the predicted trailer wheel path and the obstacle location to determine if a contact event may occur. A contact event may occur if there is a predicted intersection of the obstacle location and the trailer wheel path. The method may generate 640 a warning control signal in response to the predicted contact event. In some exemplary embodiments, the method may be operative for displaying 650 an indicator of the obstacle location and an indicator of the trailer wheel path on a vehicle cabin display. A display color of the trailer wheel path indicator may change in response to a current distance between the trailer wheel and the obstacle. The method may further be operative for amending 660 a map data in response to the obstacle location and the tow vehicle location and wherein the trailer wheel path is determined in response to the map data.

Figure 7:
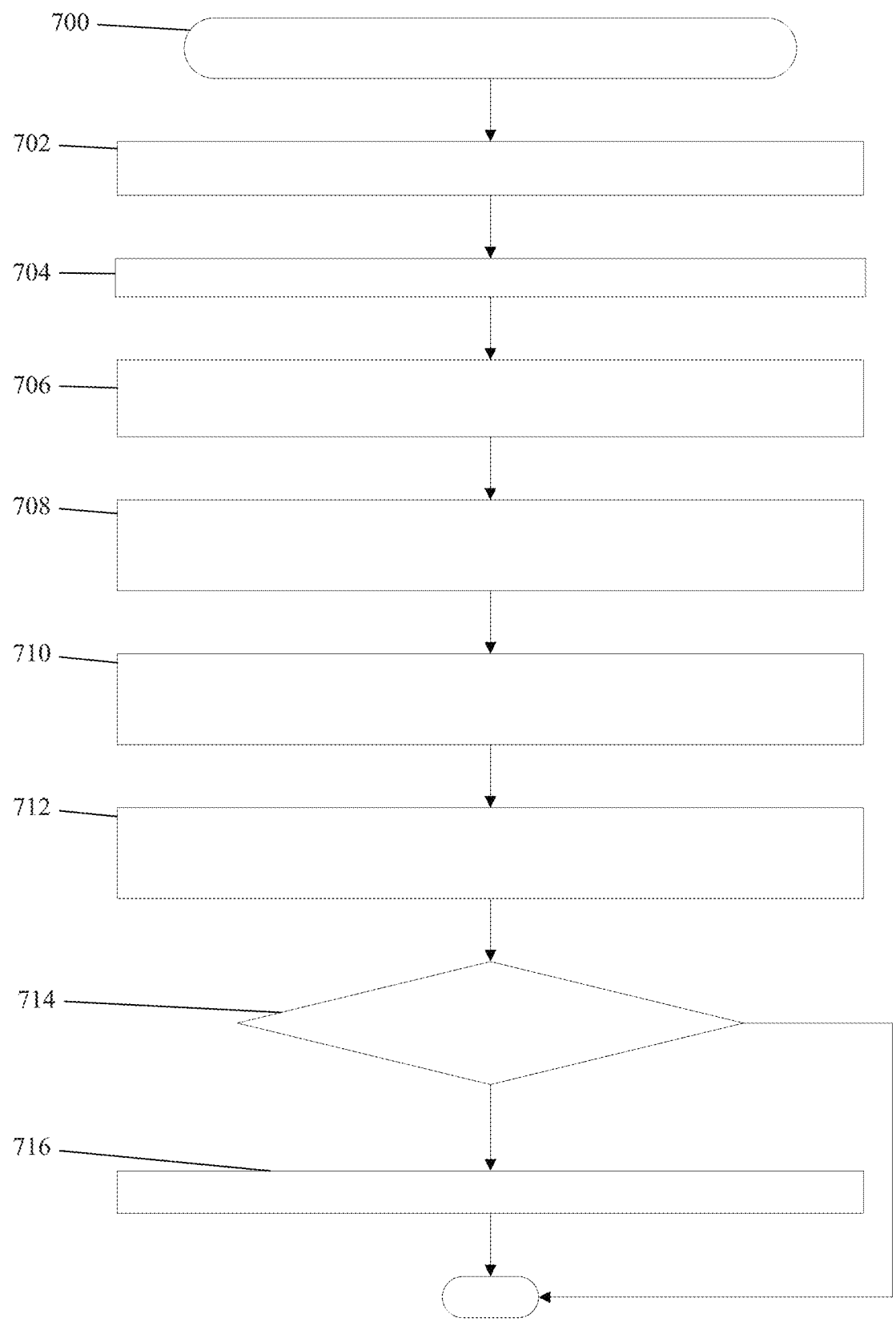
FIG. 7 is a flow chart of depicts a flow diagram of an object differentiation process suitable for implementation by a detection service in connection with a vehicle according to one or more implementations described herein to differentiate potential noise from a detected roadway boundary and suppress alerts in response to noise.

Referring now to FIG. 7, in practice, environmental conditions (e.g., snow, rain, dust, fog and/or the like) or other factors (e.g., parked vehicles, obstacles and/or the like) may impact the ability of the trailer path hazard detection system to accurately and reliably detect the location of the curb or other roadway boundary, and correspondingly, impact the efficacy of the alerts or other guidance provided by the trailer path hazard detection system. Accordingly, exemplary implementations described herein employ an object differentiation process 700 to differentiate between objects and noise to mitigate sensor occlusion or other environmental conditions or factors to improve the accuracy and reliability of curb collision alerts and suppress collision alerts in noisy or otherwise occlusive environments that could reduce efficacy of the alerting (e.g., due to false positive alerts or false negatives, etc.). For illustrative purposes, the following description may refer to elements mentioned above in connection with FIGS. 1-6. While portions of the object differentiation process 700 may be performed by different elements of a vehicle system, for purposes of explanation, the subject matter may be primarily described herein in the context of the object differentiation process 700 being primarily performed by a curb detection service, a hazard detection service, or another detection service supported by a processor 240, 520 or another controller 270 associated with a vehicle.

Referring to FIG. 7, in exemplary implementations, the object differentiation process 700 initializes or otherwise begins by receiving, identifying or otherwise obtaining a current curb detection vector defining the roadway boundary or other obstacle adjacent to the vehicle for subsequent analysis and alerting at 702. In this regard, the object differentiation process 700 obtains a vector (or matrix) that includes a plurality of different points in space that define a detected edge adjacent to the vehicle derived from a fusion of the current or most recent sampling of the onboard sensors and cameras. For example, as described above, the most recent image data sample from an image sensor (e.g., camera 510) and the most recent distance measurement data from a distance sensor (e.g., distance sensor 515) may be correlated, fused or otherwise combined and then analyzed or processed using one or more edge detection techniques as described above to derive a spatial vector of points that defines the location of the detected object or obstacle adjacent to the vehicle that is believed to represent the curb or other lateral roadway boundary to be avoided. Accordingly, for purposes of explanation, the resulting vector defining the location of a detected edge derived from the sampled data provided by the onboard camera(s) and sensor(s) may alternatively be referred to herein as the curb detection vector. For example, the current curb detection vector perceived via the onboard sensor(s) at time k may be defined by M number of different spatial points represented in the vehicle coordinate system as a vector $V_k=[p_{k,1} \cdots p_{k,M}]$, where each point $p_k$ is defined three-dimensionally relative to the vehicle in the vehicle coordinate system based on the measured or estimated distance to (or depth of) the respective point corresponding to a detected edge feature and the measured or estimated height or elevation of the respective point. It should be appreciated that the subject matter described herein is not limited to any particular number or dimensionality of spatial points associated with the curb detection vector.

At 704, the object differentiation process 700 identifies or otherwise obtains the preceding curb detection vector from a preceding sampling point in time and calculates or otherwise determines a value for a deviation metric associated with the current curb detection vector based on a relationship between the current curb detection vector and the preceding curb detection vector at 706. For example, in one implementation, the object differentiation process 700 calculates or otherwise determines a deviation metric (δ) as the average Euclidean distance between respective points of the respective pair of successive curb detection vectors in accordance with the equation $$\delta = \frac{\sqrt{(p_{k,1} - p_{k-1,1})^2 + (p_{k,2} - p_{k-1,2}) + \ldots + (p_{k,M} - p_{k-1,M})^2}}{M},$$

the $p_k$ terms represent spatial points of the current curb detection vector $V_k$ and the $p_{k-1}$ terms represent spatial points of the preceding curb detection vector $V_{k-1}$ from the preceding sampling of the onboard sensors. That said, it should be appreciated that the subject matter described herein is not limited to any particular method or technique for determining the amount of deviation associated with the current curb detection vector, and practical implementations may utilize any sort of statistical metrics or techniques for determining a quantitative value representing the relative amount of deviation between successive detection vectors.

After determining a value quantifying the deviation associated with the current curb detection vector relative to a preceding curb detection vector, the object differentiation process 700 continues by classifying or otherwise categorizing the current curb detection vector based on the value for the deviation metric at 708. In exemplary implementations, when the deviation metric associated with the current curb detection vector is less than a tolerable threshold value (e.g., $\delta<\delta_{th}$) that is indicative of the absence of potential sensor occlusion or other anomalous environmental conditions that could otherwise impair the ability of the onboard sensors to accurately perceive and detect the curb. Accordingly, the tolerable deviation threshold value may alternatively be referred to herein as the sensor occlusion threshold value since a deviation metric exceeding the threshold value may be indicative of a sensor occlusion, an environmental condition or another anomalous condition that is impacting the ability of the curb or other roadway boundary to be perceived and detected by the onboard sensors.

When the current deviation metric value is less than the sensor occlusion threshold value, the object differentiation process 700 classifies or otherwise assigns the current curb detection vector to a primary bin of curb detection vectors, which includes a preceding number of curb detection vectors from preceding sampling times that were within the occlusion threshold deviation ($\delta_{th}$) of their respective preceding curb detection vectors. Thus, the primary bin of curb detection vectors includes a series of curb detection vectors that are considered non-anomalous and suitable for analysis to detect or otherwise identify a potential contact event with a curb defined by the sequence of curb detection vectors in the primary bin (e.g., at 350 of the method 300).

On the other hand, when the deviation metric associated with the current curb detection vector is greater than the sensor occlusion threshold value (e.g., $\delta>\delta_{th}$), the object differentiation process 700 classifies or otherwise assigns the current curb detection vector to a second bin of curb detection vectors that are considered to be potentially anomalous (e.g., due to sensor occlusion or another anomalous condition) and potentially unsuitable for subsequent analysis. In this manner, the tolerable deviation threshold value may be calibrated and configured to effectively cluster or otherwise classify statistically similar preceding curb detection vectors for analysis, while excluding potentially noisy or anomalous curb detection vectors from consideration (e.g., to avoid false positive alerts).

After classifying the current curb detection vector, the object differentiation process 700 identifies or otherwise selects a subset of the curb detection vectors for monitoring and analysis based on the outcome of the classification at 710. In this regard, in exemplary implementations, the object differentiation process 700 selects or otherwise identifies the sequence or series of the curb detection vectors classified into the primary bin as the subset of curb detection vectors for subsequent monitoring and analysis when the number of preceding curb detection vectors assigned to the primary bin is greater than the number of preceding curb detection vectors assigned to the secondary bin. On the other hand, when the number of preceding curb detection vectors assigned to the secondary bin is greater than the number of preceding curb detection vectors assigned to the primary bin, the object differentiation process 700 swaps the secondary bin and the primary bin (i.e., the secondary bin becomes the primary bin and vice versa), and then selects or otherwise identifies the sequence or series of the curb detection vectors that were previously classified into the secondary bin as the new primary subset of curb detection vectors to be focused on for analysis. For example, when the onboard sensors perceive a parked car or other obstacle that provides a detectable edge for the roadway boundary that results in a sudden jump in the curb detection vectors, the curb detection vectors are assigned to the secondary bin until the number of curb detection vectors assigned to the secondary bin exceeding the number assigned to the primary bin, resulting in the object differentiation process 700 swapping the bin designations and effectively refocusing the curb or other hazard detection algorithms on the more recent subset of vectors corresponding to the parked car or other obstacle.

As described above in the context of FIGS. 1-6, in exemplary implementations, one or more curb detection vectors from the primary subset of curb detection vectors associated with the primary bin are utilized to determine, estimate, or otherwise identify the location of the curb or other obstacle or object defining a roadway boundary to be utilized when generating a local area map and analyzed for a potential contact event. For example, the most recent curb detection vector assigned to the primary bin may be utilized as the estimated location of the curb for updating the local area map at 330 of the method 300 (e.g., by using the spatial points $p_k$ of the most recent vector in the primary bin to render the indicator 405 corresponding to the detected curb location), while also being utilized as to detect potential contact with the curb at 350 of the method 300 (e.g., by detecting a possible contact event when the predicted trailer path intersects a line or other an estimated lateral roadway boundary defined by the spatial points $p_k$ of the most recent vector in the primary bin).

Still referring to FIG. 7, in exemplary implementations, the object differentiation process 700 continues by calculating or otherwise determining values for one or more noise metrics over a preceding subset of curb detection vectors at 712 and analyzes the resulting noise metric value(s) to detect or otherwise identify when a current noise metric value is greater than a suppression threshold at 714. In this regard, when a current noise metric value is greater than the suppression threshold, the object differentiation process 700 automatically suppresses or otherwise disables any predicted contact alerts that would otherwise be generated based on the most recent curb detection vector(s) in the primary bin at 716. For example, the alert control signal or other warning signal that would otherwise be provided by the processor 240 to the user interface 260 and/or the vehicle controller 270 may be automatically suppressed, deactivated, or otherwise disabled to prevent any sort of auditory, visual, haptic or other type of alert that would otherwise be generated in response to a potential contact event. In one implementation, the processor 240 may automatically generate or otherwise provide a flag signal while the value for a noise metric is greater than a suppression threshold and maintain the flag signal to disable any alerting features until the value for the noise metric falls below the suppression threshold. In this regard, although the detected curb indicator may encroach on or otherwise approach the vehicle and/or the projected trailer wheel path on a hazard guidance graphical user interface display, the object differentiation process 700 may temporarily suppress or otherwise inhibit coloration feedback or other alerts that would otherwise indicate imminent collision risk until the amount of noise is reduced to avoid false positive alerts due to sensor occlusion or other environmental conditions.

In one implementation, the noise metric is calculated or otherwise determined as a sum of the values for the deviation metric associated with a preceding number (N) of curb detection vectors represented by equation $\Delta = \sum_{i=1}^{N} \delta_i$, where $\delta_i$ represents the respective deviation metric value associated with a respective one of the N preceding curb detection vectors maintained in a respective one of the primary or secondary bins. When the noise metric is greater than an alert suppression threshold (e.g., $\Delta > \Delta_{th}$), the object differentiation process 700 determines any potential contact alerts should be temporarily suppressed or otherwise deactivated until the noise metric falls below the alert suppression threshold after a subsequent sampling and updating of the curb detection vector. In this regard, the alert suppression threshold ($\Delta_{th}$) may be calibrated or otherwise configured to reduce the likelihood of false negatives while also preventing false positive contact alerts that could otherwise result from implausible jumps in the detected curb location, which could be attributable to sensor occlusion, environmental conditions or other noise or some other obstacle or object obstructing perception of the curb.

In an exemplary implementation, the primary and secondary bins are implemented using buffers where the cumulative number of vectors assigned to the bins is maintained less than or equal to the number N. For example, in one implementation, the primary bin is implemented as a first in first out (FIFO) buffer that maintains the most recent subset of curb detection vectors assigned to the primary bin (e.g., by having an associated deviation metric value less than the occlusion threshold $\delta < \delta_{th}$). In this regard, when the current or most recently obtained curb detection vector is assigned to the primary bin, the oldest curb detection vector in the primary bin may be evicted or otherwise discarded. In exemplary implementations, the secondary bin is implemented as a first in last out (FILO) buffer, such that the most recent curb detection vector in the secondary bin is evicted or otherwise discarded when it is older than the oldest curb detection vector in the primary bin. In this regard, as updated curb detection vectors are assigned to the primary bin, the secondary bin may be incrementally depleted by removing older outlier curb detection vectors that are no longer relevant to the current vehicle operation.

On the other hand, as updated curb detection vectors are assigned to the secondary bin, the oldest curb detection vector in the primary bin may be evicted or otherwise discarded until the number of curb detection vectors in the secondary bin is greater than the number of curb detection vectors assigned to the primary bin. Once the number of curb detection vectors classified into the secondary bin is greater than the number of curb detection vectors is greater than the number of curb detection vectors assigned to the primary bin, the object differentiation process 700 swaps the designation of the bins, such that the secondary bin becomes the new FIFO primary bin while what was previously the primary bin now becomes a FILO secondary bin. In this regard, when the bins are utilized to maintain a fixed number of N most recent curb detection vectors, the object differentiation process 700 swaps the bin designations when the number of curb detection vectors assigned to the secondary bin is greater than N divided by two.

After the bins are swapped, the newly designated primary bin includes the subset of recent curb detection vectors that were previously considered anomalous (e.g., by virtue of exceeding the tolerable deviation threshold). Accordingly, the noise suppression metric may be utilized in concert with the bin swapping to temporarily suppress or otherwise prevent potential contact alerts that could otherwise be generated based on the most recent curb detection vectors exhibiting otherwise anomalous deviation, thereby preventing false positives before and/or after the bin swapping until the noise metric falls below the suppression threshold. Thus, when the curb detection vectors jump (e.g., due to a parked vehicle or other object or obstacle impacting the ability to perceive the curb), potential false positive contact alerts may be suppressed while the various curb detection algorithms or other hazard detection algorithms are refocused to an updated primary subset of vectors. In exemplary implementations, the object differentiation process 700 continually repeats throughout operation of the vehicle to dynamically suppress potential contact alerts substantially in real-time in response to noise or other potential anomalous conditions while also dynamically adjusting focus of the curb detection algorithms or other hazard detection or guidance algorithms in response to sudden jumps in the perceived roadway boundary (e.g., by swapping primary and secondary bin designations).

By virtue of the object differentiation process 700 and the configurable deviation and noise, sensor fusion outputs utilized by a curb detection algorithm or other hazard guidance is effectively filtered to suppress potential false positive contact alerts that could otherwise be generated by sudden physical jumps in the curb detection vectors (which would otherwise be implausible for the curb) by calibrating the tolerable deviation thresholds and alert suppression thresholds. In this manner, the object differentiation process 700 may effectively detect highly noisy conditions (e.g., snowbanks, curbs covered with dead leaves, debris, snow, etc.) that could deteriorate curb detection while also differentiating anomalous conditions (e.g., assigned to secondary bins and effectively ignored) from parked cars or other obstacles (e.g., by clustering and swapping primary and secondary bin designations). As a result, false positive contact alerts due to noisy conditions or sensor occlusion are reduced by effectively filtering out noisy curb detection vectors while dynamically refocusing on valid, curbside objects, such as vehicles parked on the side of the road.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing the exemplary aspect or exemplary aspects. It should be understood that various changes can be made in the function and arrangement of elements without departing from the scope of the disclosure as set forth in the appended claims and the legal equivalents thereof.

What is claimed is:

1. A method of assisting operation of a vehicle, the method comprising:
    obtaining, by a processor associated with the vehicle, a current object location derived from one or more sensors onboard the vehicle;
    determining, by the processor, a current value for a deviation metric associated with the current object location based on a relationship between the current object location and a preceding object location derived from the one or more sensors at a preceding sampling time;
    classifying, by the processor, the current object location into a respective one of a plurality of different classifications based on the current value for the deviation metric, the plurality of different classifications including a primary subset of object locations having respective values for the deviation metric less than a first threshold, wherein classifying the current object location comprises:
        classifying the current object location into the primary subset when the current value for the deviation metric is less than the first threshold; and
        classifying the current object location into a secondary subset of object locations when the current value for the deviation metric is greater than the first threshold, the secondary subset of object locations including one or more respective object locations having respective values for the deviation metric greater than the first threshold; and
    monitoring, by the processor, a predicted vehicle path with respect to one or more object locations of the primary subset to generate an alert when the predicted vehicle path intersects the one or more object locations.

2. The method of claim 1, further comprising:
    determining, by the processor, a value for a noise metric based on the respective values for the deviation metric associated with a preceding set of object locations, the preceding set of object locations including the current object location and the one or more object locations of the primary subset of object locations; and
    disabling, by the processor, the alert when the value for the noise metric is greater than a suppression threshold.

3. The method of claim 1, further comprising swapping the primary subset and the secondary subset when a first number of object locations classified into the secondary subset is greater than a second number of object locations classified into the primary subset.

4. The method of claim 1, wherein obtaining the current object location comprises obtaining a current curb detection vector comprising a first plurality of spatial points corresponding to a detected edge based on a fusion of a most recent image data sample from an image sensor onboard the vehicle and a most recent distance measurement data sample from a distance sensor onboard the vehicle, wherein the preceding object location comprises a preceding curb detection vector comprising a second plurality of spatial points corresponding to a preceding detected edge based on a preceding fusion of a preceding image data sample from the image sensor onboard the vehicle and a preceding distance measurement data sample from the distance sensor onboard the vehicle.

5. The method of claim 4, wherein:
    determining the current value comprises determining a distance between the current curb detection vector and the preceding curb detection vector; and
    classifying the current object location comprises classifying the current curb detection vector into a primary subset of curb detection vectors when the distance is less than the first threshold.

6. The method of claim 5, wherein monitoring the predicted vehicle path comprises identifying a potential contact event when the predicted vehicle path intersects a path defined by the first plurality of spatial points of the current curb detection vector.

7. The method of claim 6, further comprising:
    determining, by the processor, a value for a noise metric based on respective distances between successive curb detection vectors of a preceding set of curb detection vectors, the preceding set of curb detection vectors including the current curb detection vector and the preceding curb detection vector and the respective distances including the distance between the current curb detection vector and the preceding curb detection vector; and
    suppressing generation of the alert in response to the potential contact event when the value for the noise metric is greater than an alert suppression threshold.

8. The method of claim 5, further comprising:
predicting a tow vehicle path based at least in part on a steering angle associated with the vehicle and a vehicle location associated with the vehicle; and
predicting a trailer wheel path based at least in part on the tow vehicle path, a dimension associated with the vehicle and a trailer dimension, wherein monitoring the predicted vehicle path comprises identifying a potential contact event when the trailer wheel path intersects a boundary defined by the first plurality of spatial points of the current curb detection vector.

9. The method of claim 4, wherein the image sensor comprises a side camera and the distance sensor comprises a side ultrasonic sensor.

10. A vehicle comprising:
a side camera to obtain image data;
a side distance sensor to obtain distance measurement data;
a user interface to provide an alert to an operator of the vehicle; and
a processor coupled to the side camera, the side distance sensor and the user interface to:
identify a current curb detection vector based at least in part on the image data and the distance measurement data, wherein the current curb detection vector comprises a first plurality of spatial points corresponding to a detected edge based on a fusion of a first current sample of the image data and a second current sample of the distance measurement data;
determine a current value for a deviation metric associated with the current curb detection vector based on a relationship between the current curb detection vector and a preceding curb detection vector derived from a preceding sampling of the image data and the distance measurement data at a preceding sampling time;
classify the current curb detection vector into a primary bin of curb detection vectors when the current value for the deviation metric is less than a threshold;
classify the current curb detection vector into a secondary bin of curb detection vectors when the current value for the deviation metric is greater than the threshold; and
monitor a predicted path associated with the vehicle with respect to at least a most recent curb detection vector of the primary bin of curb detection vectors to generate the alert in response to a predicted intersection with the predicted path.

11. The vehicle of claim 10, wherein the processor is configurable to:
determine a value for a noise metric associated with the current curb detection vector based at least in part on the current value for the deviation metric and a respective value for the deviation metric associated with the preceding curb detection vector; and
disable the alert when the value for the noise metric is greater than an alert suppression threshold.

12. The vehicle of claim 10, wherein the processor is configurable to swap designations of the primary bin and the secondary bin when a first number of curb detection vectors classified into the secondary bin is greater than a second number of curb detection vectors classified into the primary bin.

13. The vehicle of claim 10, wherein:
the preceding curb detection vector comprises a second plurality of spatial points corresponding to a second detected edge based on a preceding fusion of a preceding sample of the image data and a preceding sample of the distance measurement data; and
the current value for the deviation metric comprises a distance between the first plurality of spatial points and the second plurality of spatial points.

14. The vehicle of claim 13, wherein the processor is configurable to:
determine a value for a noise metric associated with the current curb detection vector based at least in part on the distance between the first plurality of spatial points and the second plurality of spatial points and preceding distances between successive curb detection vectors; and
disable the alert when the value for the noise metric is greater than an alert suppression threshold.

15. A non-transitory computer-readable medium comprising executable instructions that, when executed by a processor, cause the processor to provide a detection service configurable to:
obtain a current object location derived from one or more sensors onboard a vehicle;
determine a current value for a deviation metric associated with the current object location based on a relationship between the current object location and a preceding object location derived from the one or more sensors at a preceding sampling time;
classify the current object location into a respective one of a plurality of different classifications based on the current value for the deviation metric, the plurality of different classifications including a primary subset of object locations having respective values for the deviation metric less than a first threshold;
monitor a predicted vehicle path with respect to one or more object locations of the primary subset to generate an alert when the predicted vehicle path intersects the one or more object locations; and
swap the primary subset and the secondary subset when a first number of object locations classified into the secondary subset is greater than a second number of object locations classified into the primary subset.

16. The non-transitory computer-readable medium of claim 15, wherein the detection service is configurable to:
determine a value for a noise metric based on the respective values for the deviation metric associated with a preceding set of object locations, the preceding set of object locations including the one or more object locations of the primary subset of object locations; and
disable the alert when the value for the noise metric is greater than an alert suppression threshold.

17. The non-transitory computer-readable medium of claim 15, wherein the detection service is configurable to:
classify the current object location into the primary subset when the current value for the deviation metric is less than the first threshold; and
classify the current object location into a secondary subset of object locations when the current value for the deviation metric is greater than the first threshold, wherein the secondary subset of object locations includes one or more respective object locations having respective values for the deviation metric greater than the first threshold.

18. The non-transitory computer-readable medium of claim 15, wherein the detection service is configurable to swap designations of the primary bin and the secondary bin when a first number of curb detection vectors classified into the secondary bin is greater than a second number of curb detection vectors classified into the primary bin.

19. The non-transitory computer-readable medium of claim 15, wherein the detection service is configurable to obtain the current object location derived from one or more sensors onboard a vehicle by obtaining a current curb detection vector comprising a first plurality of spatial points corresponding to a detected edge based on a fusion of a most recent image data sample from an image sensor onboard the vehicle and a most recent distance measurement data sample from a distance sensor onboard the vehicle.

20. The non-transitory computer-readable medium of claim 19, wherein the preceding object location comprises a preceding curb detection vector comprising a second plurality of spatial points corresponding to a preceding detected edge based on a preceding fusion of a preceding image data sample from the image sensor onboard the vehicle and a preceding distance measurement data sample from the distance sensor onboard the vehicle.

* * * * *